United States Patent [19]
Bergen

[11] Patent Number: 6,097,958
[45] Date of Patent: Aug. 1, 2000

[54] METHOD AND APPARATUS FOR LOCATING AND TRACKING CELLULAR TELEPHONES IN A CDMA CELLULAR COMMUNICATION NETWORK

[75] Inventor: Scott Bergen, Crestwood, Ky.

[73] Assignee: Northern Telecom Limited, Montreal, Canada

[21] Appl. No.: 08/949,063

[22] Filed: Oct. 10, 1997

[51] Int. Cl.[7] .................................................. H04Q 7/20
[52] U.S. Cl. ............................................ 455/456; 455/517
[58] Field of Search ..................................... 455/432, 433, 455/435, 456, 457, 560, 410, 411, 517, 524

[56] References Cited

U.S. PATENT DOCUMENTS

| | | |
|---|---|---|
| 5,388,147 | 2/1995 | Grimes . |
| 5,396,543 | 3/1995 | Beeson, Jr. et al. ..................... 455/560 |
| 5,404,376 | 4/1995 | Dent . |
| 5,446,756 | 8/1995 | Mallinckrodt . |
| 5,508,708 | 4/1996 | Ghosh et al. . |
| 5,510,797 | 4/1996 | Abraham et al. . |
| 5,512,908 | 4/1996 | Herrick . |
| 5,515,419 | 5/1996 | Sheffer ..................................... 455/456 |
| 5,535,431 | 7/1996 | Grube et al. ............................. 455/411 |
| 5,548,583 | 8/1996 | Bustamante . |
| 5,551,058 | 8/1996 | Hucheson et al. . |
| 5,551,059 | 8/1996 | Hucheson et al. . |
| 5,559,864 | 9/1996 | Kennedy, Jr. . |

*Primary Examiner*—Reinhard J. Eisenzopf
*Assistant Examiner*—Sam Bhattacharya
*Attorney, Agent, or Firm*—Haynes & Boone, L.L.P.

[57] ABSTRACT

A system and method for initially locating and subsequently tracking the location of one or more mobile phones in a cellular communication network are disclosed. Software for implementing a scheduling and tracking system ("STS") is incorporated into the base station controller ("BSC") of a cellular communication network for performing scheduling and tracking functions with respect to mobile phone location. In one aspect of the invention, time difference of arrival ("TDOA") techniques are used to determine a location of each of a number of designated mobile phones active in the network. In another aspect of the invention, a scheduling portion of the STS originates and maintains a schedule of time measurement updates with reference to the previous location of the mobile phone. In yet another aspect of the invention, a tracking portion of the STS keeps track of the location of each of the designated mobile phones over time.

28 Claims, 3 Drawing Sheets

CLUSTER

| | 1 | 2 | 3 | 4 | 5 | 6 | |
|---|---|---|---|---|---|---|---|
| $t_1$ | A | | | H | E | | |
| $t_2$ | F | | B | | | | |
| $t_3$ | | C | | | | D | |
| $t_4$ | | | | | | | |
| $t_5$ | G | | | | J | | |

BTS: SECTOR

| | 1:1 | 1:2 | 1:3 | 2:1 | 2:2 | 2:3 | 3:1 | 3:2 | 3:3 | |
|---|---|---|---|---|---|---|---|---|---|---|
| $t_1$ | A | A | | | A | A | | | | |
| $t_2$ | B | | | B | | | B | | | |
| $t_3$ | C | D | CD | C | D | C | | D | | |
| $t_4$ | | | | | | | | | | |
| $t_5$ | | | | | | | | | | |
| $t_6$ | | | | | | | | | | |

METHOD AND APPARATUS FOR LOCATING AND TRACKING CELLULAR TELEPHONES IN A CDMA CELLULAR COMMUNICATION NETWORK

TECHNICAL FIELD

The invention relates generally to method and apparatus for determining the location of a cellular telephone in a cellular communication network and, more particularly, to method and apparatus for locating and tracking the location of one or more cellular telephones in such a network.

BACKGROUND OF THE INVENTION

In cellular communication networks, it is often desirable to determine the location of an active cellular telephone, or "mobile phone. " Applications for such a technology are numerous and include, for example, identifying the location of a mobile phone to a 911 dispatcher, providing such location information to a subscriber via a mobile phone for future data services such as computerized directions, and identifying the location of a mobile phone for law enforcement purposes.

One method of determining the location of a radio frequency (RF) transmitter, such as a mobile phone, makes use of known techniques such as time difference of arrival ("TDOA") and triangulation. For example, U.S. Pat. No. 5,508,708 to Ghosh et al. discloses a system for determining the location of an active mobile phone in a Code Division Multiple Access ("CDMA") network. In particular, using the CDMA modulation information, TDOA techniques are used to estimate the distance between a mobile phone and three base station transceiver subsystems ("BTSes"). Using triangulation, the three distances can be used to estimate the location of the mobile phone.

The foregoing system suffers from certain deficiencies, however. For example, initiation of a location determination depends on an external event trigger, e.g., a call to 911. Moreover, the system does not provide continuous tracking of the location of the mobile phone throughout a call or tracking of several mobile phones at once. Such additional capabilities could be used to simplify the handoff of a call between different BSC/MTX complexes and compiling detailed mobile traffic data for network planning, expansion, marketing studies, and other purposes. It would also be useful to be able to schedule time measurements needed for initially determining and then tracking the location of one or more mobile phones, a feature that is not provided by the system disclosed by Ghosh et al.

Therefore, what is needed is a system for locating and tracking one or more mobile phones in a cellular communication network.

SUMMARY OF THE INVENTION

The present invention, accordingly, provides a system and method for initially locating and subsequently tracking the location of one or more mobile phones in a cellular communication network. In a preferred embodiment, software for implementing a scheduling and tracking system ("STS") is incorporated into the base station controller ("BSC") of a cellular communication network for performing scheduling and tracking functions with respect to mobile phone location.

In one aspect of the invention, time difference of arrival ("TDOA") techniques are used to determine a location of each of a number of designated mobile phones active in the network. In another aspect of the invention, a scheduling portion of the STS originates and maintains a schedule of time measurement updates with reference to the previous location of the mobile phone. A primary function of the scheduling portion of the STS is to achieve the maximum separation between time measurements both temporally and geographically. In yet another aspect of the invention, a tracking portion of the STS keeps tracks the location of each of the designated mobile phones over time. In addition to using such tracking data to determine a current location of a designated mobile phone, the tracking data may be used for such purposes as predicting when a mobile phone will require a hard handoff to another MTX/BSC complex, facilitating the determination of network traffic for planning network expansions and updates and for marketing studies, and providing location information to the mobile phone for future data services, such as computerized directions.

A technical advantage achieved with the invention is that it enables a BSC to advantageously schedule and direct the performance of time-based measurements at multiple BTSes.

Another technical advantage achieved with the invention provides a continuous mobile phone tracking system that tracks the location of each of one or more designated mobile phones throughout a call or for any specified period of time.

Yet another technical advantage achieved with the invention is that it utilizes mobile phone location tracking data to perform optimal measurement scheduling for multiple (e.g., thousands) of mobile phones simultaneously, while distributing the incremental noise increases geographically throughout the cellular communication network, thus minimizing the capacity and interference concerns that might otherwise be associated with the tracking of a plurality of mobile phones within a cellular communication network.

DESCRIPTION OF THE PREFERRED EMBODIMENT

Figure 1:
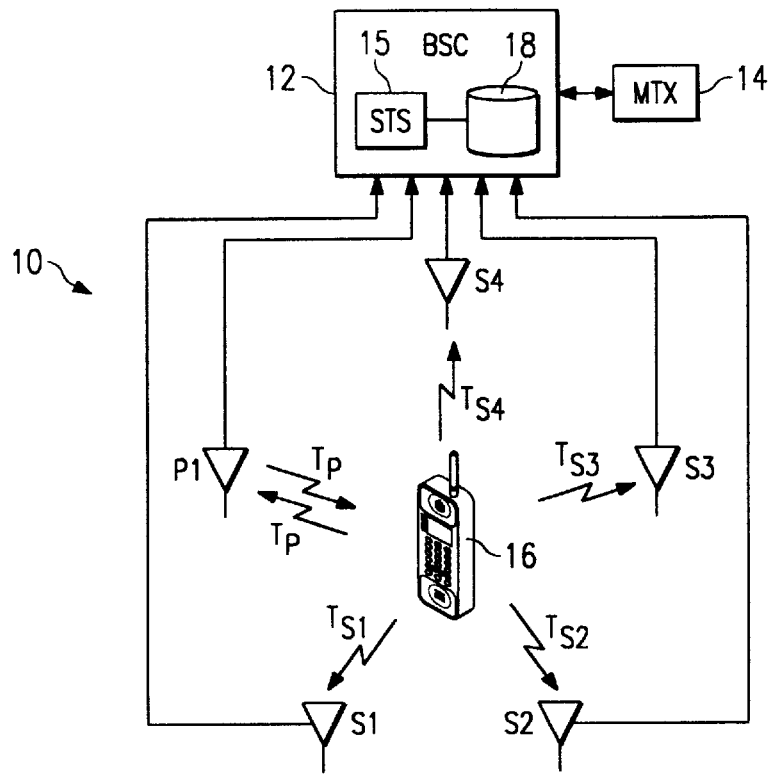
FIG. 1 is a schematic block diagram of a cellular communication network embodying features of the present invention.

FIG. 1 is a schematic block diagram of a cellular communication network 10 embodying features of the present invention. As shown in FIG. 1, the network 10 comprises a plurality of base station transceiver subsystems ("BTSes") P1, S1, S2, S3, and S4, all of which is connected to a base station controller ("BSC") 12, which in turn is connected to a mobile telephone exchange ("MTX") 14. As will be described in greater detail with reference to FIG. 4, software for implementing a scheduling and tracking system ("STS") 15 is incorporated into the BSC 12 for enabling the location of one or more active mobile phones within the network 10, such as a mobile phone 16, to be determined and tracked. As shown in FIG. 1, the mobile phone 16 is capable of communication with at least a primary BTS, e.g., the BTS P1, and one or more secondary BTSes, e.g., BTSes S1, S2, S3, and/or S4.

For reasons that will be described in detail below, for each BTS in the network 10 a "secondary set" comprising BTSes proximate to that BTS, is identified and a list of the BTSes comprising each BTS's secondary set is stored in a secondary database 18 in the BSC 12. For example, as illustrated in FIG. 1, the secondary set for the primary BTS P1 includes secondary BTSes S1, S2, S3 and S4.

As previously indicated, the present invention utilizes TDOA techniques to determine a location of the mobile phone 16 within the network 10 at a given time. Referring to FIG. 1, for example, when a secondary time measurement is scheduled (as described below) to be made for the mobile phone 16, the primary BTS P1 transmits a signal $T_P$ on the forward traffic channel to the mobile phone 16, which responds by transmitting signals $T_P, T_{S1}, T_{S2}, T_{S3}, T_{S4}$, to the BTSes P1, S1, S2, S3, S4, respectively. It will be recognized that the primary BTS P1 receives the signal from the mobile phone at a time $T_P+T_P$. The secondary BTSes S1, S2, S3, and S4 receive signals from the mobile phone 16 at times $T_P+TS_1$, $T_P+Ts_2$, $T_P+Ts_3$, and $T_P+Ts_4$, respectively. The timing data is forwarded to the BSC 12. Because the distances to which the times $T_P, Ts_1, Ts_2, Ts_3$ and $Ts_4$ correlate can be calculated and because the locations of the BTSes P1, S1, S2, S3 and S4 are known, the location of the mobile phone 16 can be calculated from this data using known TDOA techniques.

Although time measurements from only three BTSes are needed to determine the location of the mobile phone 16, by taking time measurements from the primary BTS P1 and more than two, in this case, four, secondary BTSes S1–S4, the best data can be used to determine the location of the mobile phone 16. This is especially important in cases where the three closest BTSes, which are typically used in TDOA calculations, are located on or near a line, in which case it is nearly impossible to determine the location of the mobile phone using time measurement data from those BTSes. The present invention insures that this an acceptable geometry is used whenever possible and that data from the three most geometrically well-positioned BTSes will be available to determine the mobile phone's location.

Figure 2:
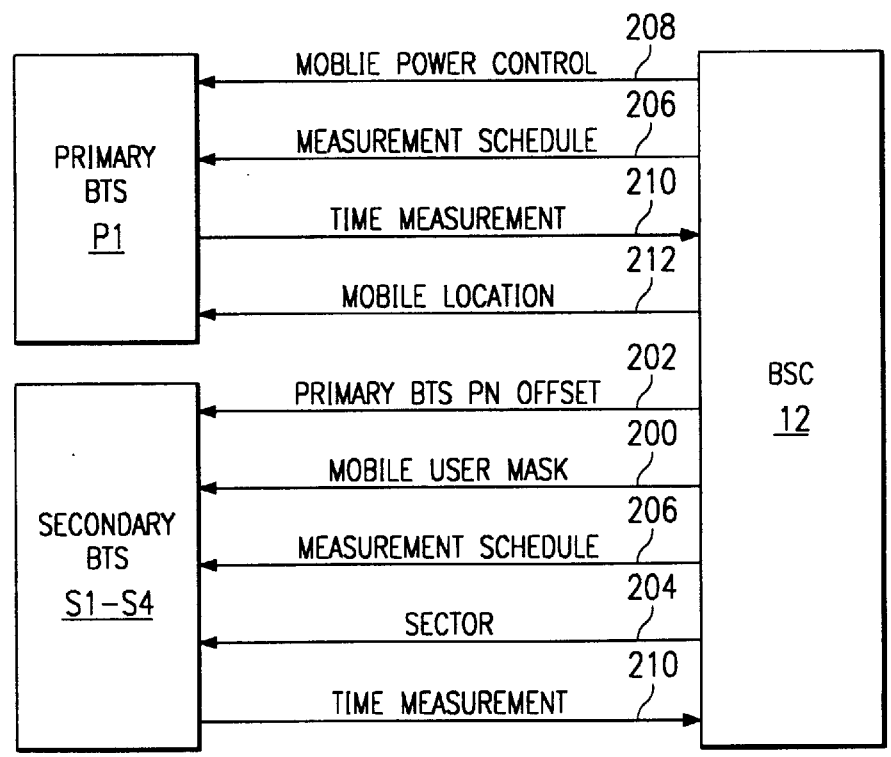
FIG. 2 is a block diagram of an interface between a BSC and a primary and a secondary BTS embodying features of the present invention.

Referring now to FIG. 2, the interfaces between the BSC 12 and the primary BTS P1 and between the BSC 12 and the secondary BTSes S1–S4 are shown and described. It will be recognized by those skilled in the art that the primary BTS P1, i.e., the BTS with which the mobile phone is actively communicating, is inherently capable of time synchronizing to an incoming signal from the mobile phone 16. It accomplishes this by generating a despreading pseudorandom noise ("PN") sequence based on the mobile phone's unique user long code mask ("user mask"). Accordingly, the primary BTS P1 receives the user mask directly from the mobile phone 16. For one or more of the secondary BTSes S1, S2, S3, and/or S4, to synchronize to mobile phone 16 requires that the BSC 12 provide the secondary BTS(es) with the user mask of the mobile phone 16, as indicated by an arrow 200.

To aid the secondary BTSes S1, S2, S3 and S4 in time synchronization, the BSC 12 also provides the secondary BTSes with the PN offset of the primary BTS P1, as indicated by an arrow 202. This will enable the secondary BTSes S1, S2, S3 and S4 to narrow the time search window, thereby reducing the time required to achieve synchronization. The BSC 12 must also inform the secondary BTSes S1–S4 on what sector to make the time measurement, as indicated by an arrow 204. As will be further discussed in detail below, the BSC 12 also instructs the primary BTS P1 and the secondary BTSes S1–S4 as to the time at which to take the measurement, as indicated by arrows 206, and instructs the primary BTS P1 to ramp up the power of the mobile phone 16 during the time the measurement is to be made, as represented by an arrow 208, to insure that the signals will be received by all of the secondary BTSes S1–S4.

Once the time measurements are made by the BTSes P1, S1, S2, S3 and S4, the secondary time measurement data are provided back to the BSC 12, as represented by arrows 210. Once the BSC 12 determines the location of the mobile phone 16 by applying TDOA techniques to the time measurement data, the location may be provided back to the primary BTS P1, as represented by an arrow 212.

In a particular embodiment, BTS channel cards (not shown) operate at a clock rate of CDMA PN chip rate×8 (i.e., 1.2288 MHz×8=9.8304 MHz). Given this rate of operation, the signal time of arrival can easily be measured to ±0.51 microseconds ((1/9.8304 MHz)/2), after allowing for the signal propagation delay from the antenna to the measurement point within the BTS. This time uncertainty equates to a worst case mobile range error for an unmodified BTS channel card of ±150 meters, yielding a worst case position (latitude/longitude) error of 212 meters circular. The nominal single measurement position error is 106 meters circular. This error can be reduced by modifying a BTS channel card to make a more accurate initial measurement, resulting in an improvement of the single measurement position accuracy by a factor of ten or more (10 meters circular). Alternatively, several fully independent (i.e., using different BTS combinations) measurements could be made within the allocated 100 millisecond measurement window, resulting in a position error of possibly less than 30 meters circular, it being understood that the actual accuracy of any signal measurement will depend on the specific geometry of the measurements, the number of measurements and the independence of the measurements.

It is desirable to limit the amount of time that each BTS spends making secondary time measurements. To accurately track mobile phones within a network, such as the network 10, the location of each mobile phone, such as the mobile phone 16, need not be measured more than once every ten seconds. Accordingly, to reduce loading on the BTSes P1, S1, S2, S3 and S4, the STS 15 enables scheduling mobile phones for updates. As a single secondary time measurement can be made by a BTS in well under 100 milliseconds, a single BTS traffic channel can support more than 100 secondary time measurements continuously and still meet the ten second location update rate. The key is utilizing the STS 15 of the BSC 12 to schedule the measurements, as will be described.

Figure 3:
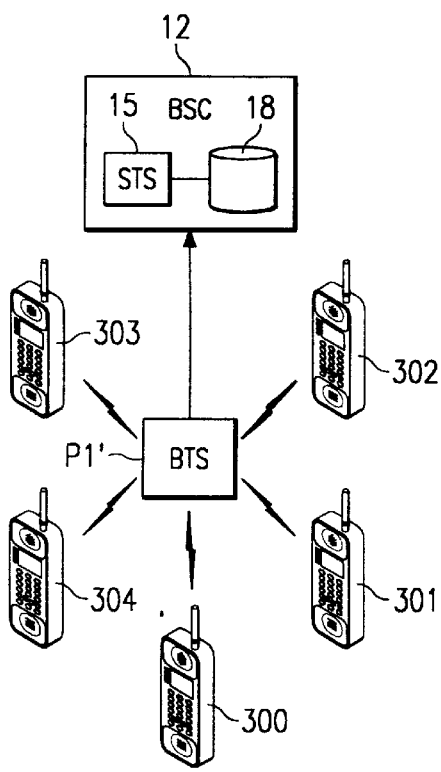
FIG. 3 illustrates a scheduling feature of the present invention.

The concept of scheduling is further illustrated with reference to FIG. 3, in which a BTS P1' connected to the BTS 12 is the primary BTS for a plurality of active mobile phones 300, 301, 302, 303 and 304. A scheduling portion of the STS 15 of the BSC 12 constructs and then provides to the BTS P1' a measurement schedule for causing the primary BTS to initiate a secondary time measurement for mobile phone 300 at a time $t_0$, for mobile phone 301 at a time $t_1$, for mobile phone 302 at a time $t_2$, for mobile phone 303 at a time $t_3$, and so on for up to more than one hundred mobile phones, assuming each secondary time measurement can be completed in less than 100 milliseconds and assuming measurements for each mobile phone are to be taken no more often than every ten seconds. Moreover, given BTS hardware operating speed, it is likely that the actual measurement time could be reduced to ten milliseconds, such that about 1000 measurements every ten seconds could be supported on a single traffic channel.

Referring again to FIG. 1, as previously mentioned, during typical operation in a live network, the power of the mobile phone 16 is adjusted so that only the primary BTS P1 can receive the mobile phone's signal. However, during a secondary time measurement, the mobile phone 16 must be directed to ramp up its power so that the secondary BTSes S1–S4 can also receive the mobile phone's signal. The power up command can be supplied with the measurement schedule to the primary BTS P1 so that the primary BTS P1 can instruct the mobile phone 16 to power up immediately before a secondary time measurement is scheduled for that phone and to return to normal power immediately thereafter, so as to limit noise in the network 10.

A primary function of the STS 15 is to schedule the secondary time measurements to be performed by each BTS P1, S1, S2, S3 and S4. In order to calculate an accurate location for the mobile phone 16, the measurements should occur concurrently on at least three, and preferably more than three, BTSes. The BSC 12 must tell the BTSes P1, S1, S2, S3 and S4 when to make the measurement, as well as which sector(s) to utilize.

Another feature of the scheduling portion of the STS 15 is to ensure that measurements that are simultaneously made are made for mobile phones that are geographically remote from one another, thereby minimizing the possibility of interference between two phones when their power is ramped up. One method of accomplishing this is to view the network 10 as being divided into a plurality of clusters each comprising three to five BTSes, or ten to fifteen sectors, wherein the scheduling feature of the STS 15 schedules secondary time measurements to be made for designated mobile phones such that they are made for no more than one mobile phone per cluster at a time. This concept is more fully described below with reference to FIG. 6A.

Accordingly, the primary purpose of the scheduling feature of the STS 15 is to maximize the separation of secondary time measurements for designated mobile phones both temporally and geographically.

Figure 4:
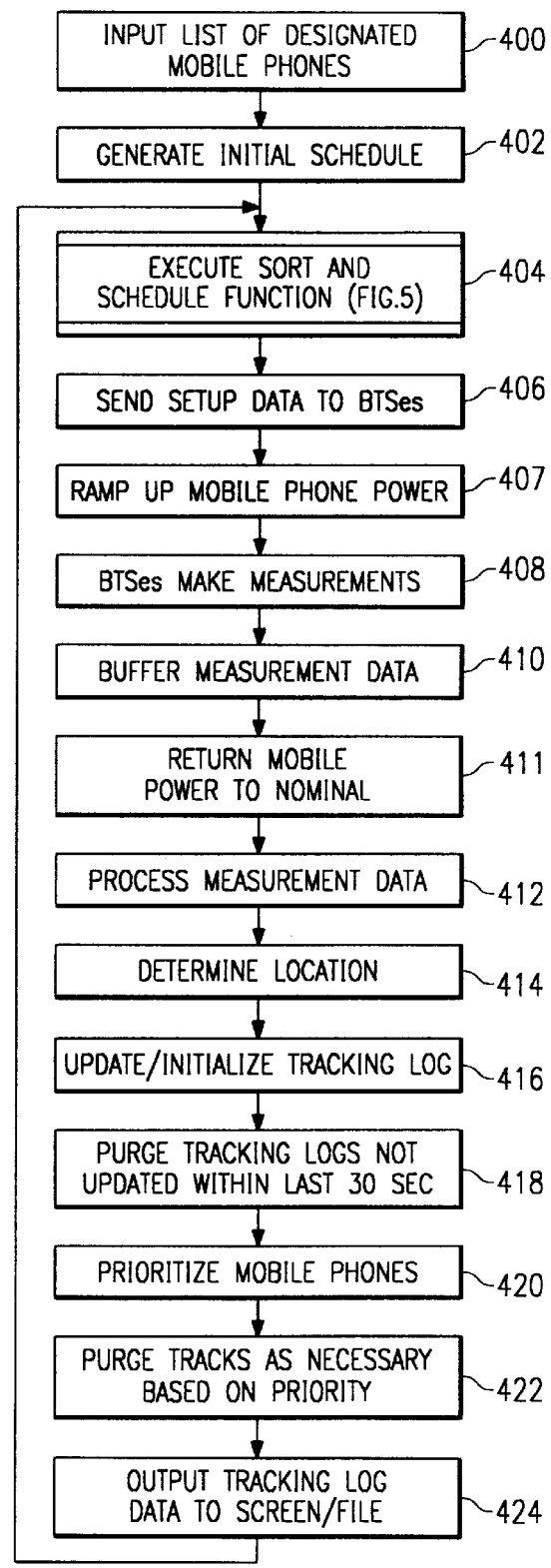
FIGS. 4 and 5 are flowcharts of the operation of the scheduling and tracking system of the present invention.
Figures 5, 6A, 6B:
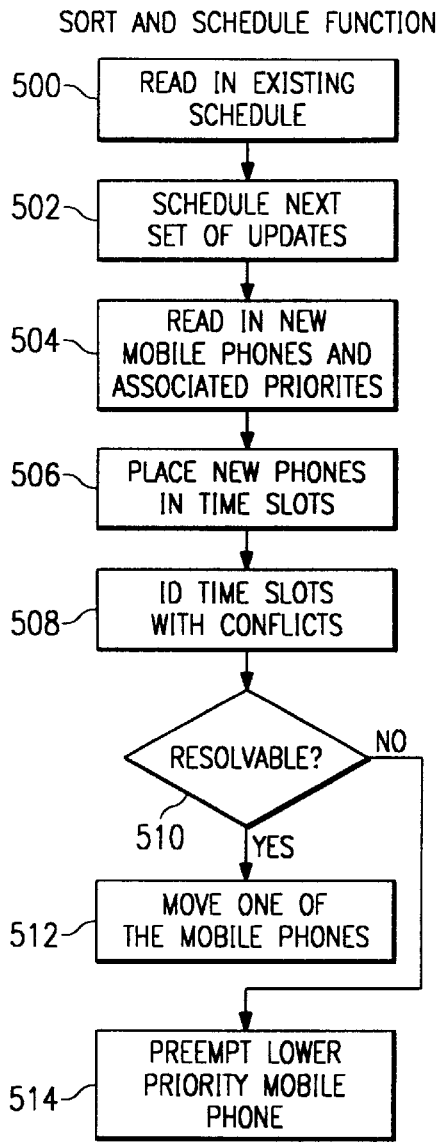
FIGS. 6A and 6B illustrate sorting and scheduling features of the scheduling and tracking system of the present invention.

FIGS. 4 and 5 illustrate the operation of the STS 15. In step 400, a list of mobile phones to be tracked is input. In particular, the list of designated mobile phones input in step 400 could comprise any conceivable combination of active mobile phones in the network 10, including all active mobile phones. For example, mobile phones could be designated individually by ID or in groups by class or geographic location, for example. Moreover, the list could be generated in response to a 911 call, a user request, or a third party request. Once a list of designated mobile phones has been input, execution proceeds to step 402, in which an initial schedule is generated taking into account the relative locations and priorities of the mobile phone, as described in greater detail below. In step 404, a sort and schedule function, as more fully described with reference to FIG. 5, is executed.

The following steps 406–424 are performed simultaneously for each designated mobile phone and will be described with reference to mobile phone 16 of FIG. 1. It will be assumed for the sake of example that time measurements for the mobile phone 16 are scheduled to be made at a time t0. In step 406, at a time $t_0$—100 ms, for example, setup data is sent to the BTSes P1 and S1–S4. In particular, for the primary BTS P1, setup data includes a measurement schedule, while for the secondary BTSes S1–S4, setup data includes the measurement schedule, the PN offset of the primary BTS, the user mask of the mobile phone 16 and the sector(s) on which to take the measurement. In step 407, at a time $t_0$—50 ms, for example, the primary BTS P1 commands the mobile phone 16 to ramp up its power during time window in which the measurement is scheduled to take place. In step 408, at a time to, secondary time measurements are made by the BTSes P1 and S1–S4. In step 410, the secondary time measurement data is buffered. In step 411, the power of the mobile phone is returned to a nominal level. In step 412, the BSC 12 processes the buffered measurement data. In particular, the BSC 12 considers all of the secondary time measurement data from the BTSes P1 and S1–S4 and selects the three optimal sets of data. In step 414, the location of the mobile phone 16 is determined, for example, by performing a TDOA analysis on the data selected in step 410. In step 416, the location data determined in step 414 is added to an existing tracking log for the mobile phone 16 or used to initiate a new tracking log for that mobile phone.

In step 418, tracking logs that have not been updated for 30 seconds are purged. In step 420, the tracking logs are prioritized based on a rule set. The priority rule set is established for two reasons. First, it enables the STS 15 to react quickly to a high priority request, such as a 911 call. Second, it prevents the STS 15 from getting overloaded. Like the designation of the initial list of mobile phones to be tracked, the priority rule set is limited only by the imagination of the system designer. The priority rule set could be embedded into the system, entered by the user, or a combination of the two. An example priority rule set is:

1. 911 calls
2. law enforcement wire taps
3. service class 1
4. service class 2
5. all others In step 422, tracking logs are purged as necessary based on their priority. For example, if the tracking capacity of the STS is 1000 mobile phones and there are more than 1000 designated mobile phones, on each cycle, the STS counts the tracking logs and purges the low priority tracking logs until there are only 1000 remaining tracking logs. Finally, in step 424 the information contained in the tracking logs is output to a display or a file, as designated by a user. For example, the information contained in the tracking logs could be used to track the current location of each of one or more mobile phones with reference to the latitude and longitude, speed, past location and/or predicted future location (in ten second increments). Alternatively, the information contained in the tracking logs could be mapped to streets. Moreover, a log of historical location data could be used in to determine historical traffic patterns to aid in planning for updates to the network 10. Finally, any number of different sorting algorithms could be used on the logs. Once the information contained in the tracking logs is output in the designated manner, execution returns to step 404.

Referring now to FIG. 5, the sort and schedule function (step 404, FIG. 4) will be described in greater detail. In step 500, the current schedule is input. In step 502, the existing mobile phones are sorted by cluster and update time slots are scheduled based on the last update time, the cluster, and the current primary BTS active sector for each mobile phone. In particular, as illustrated in FIG. 6A, a geographic sorter places designated mobile phones within a cluster based initially on the mobile phone's current primary BTS sector and subsequently on the mobile phone's actual location.

A primary goal of scheduling is to limit measurements to one mobile phone per cluster at any given time, thereby distributing incremental noise generated by the ramping up of power of the mobile phones during the measurement throughout the network. A secondary goal of scheduling is to limit resource utilization oat the BTS(es) by the measurements. By dispersing the measurements in time, a single BTS hardware channel element is shared by multiple mobile phones and utilized hundreds of times over the ten second update rate. A BTS may be configured with up to 120 channel elements, so using one is not significant. Therefore, there is no additional BTS hardware cost for implementing this apparatus, and utilization of the hardware has minimal effect on subscriber access or blocking rates. The cluster definition for a network is mapped out during the installation of the BTS for the network and then updated as necessary as the network evolves.

As shown in FIG. 6A, measurements for mobile phones designated A, H, and E, located in clusters 1, 4, and 5, respectively, are scheduled to occur at time $t_1$. Measurements for mobile phones designated F and B, located in clusters 1 and 3, respectively, are scheduled to occur at time $t_2$. Measurements for mobile phones designated C and D, located in clusters 2 and n, are scheduled to occur at time $t_3$. Measurements for mobile phones designated G and J, located in clusters 1 and 5, respectively, are scheduled to occur at time $t_5$.

It will be recognized that, although only five different times ($t_1$–$t_5$) and six clusters (1–6) are illustrated, the actual number of times available will be limited only by the STS cycle time and the amount of time it takes to make a single measurement, while the actual number of clusters will be limited only by the size of the particular cellular communications network.

Returning to FIG. 5, in step 504, new mobile phones, i.e., mobile phones that have been designated since the last time the sort and scheduling function was executed, are input along with their associated priorities. In step 506, the new mobile phones are input into the schedule based on the primary BTS active sector and priority thereof, with higher priority mobile phones being scheduled first. In step 508, time slots with conflicts by BTS are identified. For example, FIG. 6B, illustrates mobile phones scheduled by BTS and sector number. In particular, mobile phone A of FIG. 6A is scheduled at time $t_1$ for sectors 1 and 2 of a BTS1 and sectors 2 and 3 of a BTS2. Mobile phone B of FIG. 6A is scheduled at a time $t_2$ for sector 1 of BTS1, sectors 1 and 3 of BTS2, and sector 1 of a BTS3. Mobile phone C of FIG. 6A is scheduled at a time $t_3$ for sectors 1 and 3 of BTS1 and sectors 1 and 3 of BTS2. A mobile phone D is also scheduled at a time $t_3$ for sectors 2 and 3 of BTS1, sector 2 of BTS2, and sector 2 of BTS3. For ease of illustration and explication, mobile phones E, F, G, and J of FIG. 6A are not shown in FIG. 6B. A conflict is illustrated at a time $t_3$ with reference to BTS1, sector 3, at which measurements are scheduled for both mobile phone C and mobile phone D. In step 510, a determination is made whether the conflict can be resolved by shifting the lower priority mobile phone back or the higher priority mobile phone ahead by 0.01 to 3.0 seconds. If so, execution proceeds to step 512, in which the conflict is resolved; otherwise, execution proceeds to step 514, in which the lower priority mobile phone is preempted.

It will be recognized by those skilled in the art that the STS 15 could also be implemented in the MTX 14, instead of the BSC 12. This would be especially beneficial in networks comprising multiple BSCs, for obvious reasons.

Moreover, the present invention may be implemented in Global System for Mobile Communications ("GSM") and Time Division Multiple Access ("TDMA"), as well as CDMA, cellular communication networks.

Still further, the scheduling and tracking functions of the STS 15 may be used in connection with any location determination technique, including, but not limited to, TDOA triangulation, round-trip ranging and triangulation, or direction finding triangulation, all of which are well known in the art and will not be further described herein.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of tracking a plurality of cellular telephones in a cellular telephone network, the method comprising:

selecting a plurality of cellular telephones to be tracked;

scheduling time measurements for each of said selected cellular telephones, wherein said scheduling comprises assigning update times to said selected cellular telephones to achieve maximum possible separation between said update times across said cellular telephone network both temporally and geographically;

for each of said selected cellular telephones:
performing said time measurements according to said assigned update time;
determining a location of said selected cellular telephone using said time measurements; and
adding said determined location to a tracking log for said selected cellular telephone.

2. The method of claim 1 wherein said assigning update times to said selected cellular telephones is based on a last update time, a cluster, and a current primary BTS active sector of each of said selected cellular telephones.

3. The method of claim 1 further comprising outputting information contained in one or more of said tracking logs in a manner designated by a user.

4. The method of claim 1 wherein said selecting comprises designating a class of service, wherein all cellular telephones of said designated class of service are selected to be tracked.

5. The method of claim 1 wherein said selecting comprises designating a geographic area of said cellular telephone network, wherein all cellular telephones active within said designated geographic area are selected to be tracked.

6. The method of claim 1 wherein said selecting comprises selecting all cellular telephones active within said cellular telephone network.

7. The method of claim 1 wherein said cellular telephone network is a CDMA network.

8. In a cellular communication network comprising a base station controller ("BSC") and a plurality of base station transceiver subsystems ("BTSes"), a method of locating and tracking a location of a plurality of cellular telephones comprising:

identifying at least one cellular telephone to be located and tracked;

for each of said identified cellular telephones, determining a primary BTS ("PBTS") and at least two secondary BTSes ("SBTSes") for said identified cellular telephone;

scheduling a time for performing time measurements for each of said identified cellular telephones, wherein said scheduling comprises assigning update times to said selected cellular telephones to achieve maximum possible separation between said update times across said cellular telephone network both temporally and geographically;

for each of said identified cellular telephones:
immediately prior to said scheduled time, sending setup information to each of said PBTS and SBTSes;
subsequent to said sending setup information, said PBTS ramping up the power of said identified cellular telephone;
at said scheduled time, said PBTS and said SBTS performing said time measurements and forwarding said time measurements to said BSC; and
said BSC determining a location of said cellular telephone using said time measurements and adding said location to a tracking log for said cellular telephone.

9. The method of claim 8 wherein said assigning update times to said selected cellular telephones is based on a last update time, a cluster, and a current primary BTS active sector of each of said selected cellular telephones.

10. The method of claim 8 further comprising outputting information contained in one or more of said tracking logs in a manner designated by a user.

11. The method of claim 8 wherein said selecting comprises designating a class of service, wherein all cellular telephones of said designated class of service are selected to be tracked.

12. The method of claim 8 wherein said selecting comprises designating a geographic area of said cellular telephone network, wherein all cellular telephones active within said designated geographic area are selected to be tracked.

13. The method of claim 8 wherein said selecting comprises selecting all cellular telephones active within said cellular telephone network.

14. The method of claim 8 wherein said cellular telephone network is a CDMA network.

15. A method of updating a schedule of time measurements to be performed for a plurality of cellular telephones in a cellular telephone network, said time measurements for use in determining and tracking a location of said cellular telephones, the method comprising:

sorting said current cellular telephones by cluster;
assigning an update time slot to each of said current cellular telephones based on a last update time, a cluster, and a current primary BTS active sector of said current cellular telephone to achieve maximum possible separation between said update times across said cellular telephone network both temporally and geographically;
adding additional cellular telephones to said schedule, each of said additional cellular telephones being added to said schedule based on a primary BTS active sector of said additional cellular telephone to achieve maximum possible separation between said update times across said cellular telephone network both temporally and geographically;
identifying scheduling conflicts between at least two cellular telephones; and
resolving scheduling conflicts by moving a higher priority one of said at least two cellular telephones up on said schedule, moving a lower priority one of said at least two cellular telephones down on said schedule, or both until said conflict is resolved.

16. The method of claim 15 further comprising preempting one or more lower priority ones of said at least two cellular telephones if said conflict cannot be resolved.

17. The method of claim 15 wherein said assigning is performed such that time measurements are not performed simultaneously for more than one current cellular telephone in a single cluster.

18. The method of claim 15 wherein said assigning is performed such that time measurements may be performed simultaneously for more than one current cellular telephone in different clusters.

19. The method of claim 15 wherein said cellular telephone network is a CDMA network.

20. The method of claim 15 wherein each said cluster comprises at least one sector.

21. The method of claim 15 wherein said network is a multiple carrier frequency network, the method further comprising designating separate clusters for said multiple carrier frequency network.

22. Apparatus for tracking a plurality of cellular telephones in a cellular telephone network, the apparatus comprising:

means for scheduling time measurements for each of a plurality of selected cellular telephones, wherein said scheduling comprises assigning update times to said selected cellular telephones to achieve maximum possible separation between said update times across said cellular telephone network both temporally and geographically;
means for, with respect to each of said selected cellular telephones, performing said time measurements according to said scheduling, determining a location of said selected cellular telephone using said time measurements, and adding said determined location to a tracking log for said selected cellular telephone.

23. The apparatus of claim 22 wherein said means for scheduling comprises means for assigning update times to said selected cellular telephones based on a last update time, a cluster, and a current primary BTS active sector of each of said selected cellular telephones.

24. The apparatus of claim 22 further comprising means for outputting information contained in one or more of said tracking logs in a manner designated by a user.

25. The apparatus of claim 22 wherein said selecting comprises designating a class of service, wherein all cellular telephones of said designated class of service are selected to be tracked.

26. The apparatus of claim 22 wherein said selecting comprises designating a geographic area of said cellular telephone network, wherein all cellular telephones active within said designated geographic area are selected to be tracked.

27. The apparatus of claim 22 wherein said selecting comprises selecting all cellular telephones active within said cellular telephone network.

28. The apparatus of claim 22 wherein said cellular telephone network is a CDMA network.

* * * * *